(12) United States Patent
Tang et al.

(10) Patent No.: US 7,764,631 B2
(45) Date of Patent: Jul. 27, 2010

(54) METHOD FOR DYNAMIC LOSSLESS ADJUSTMENT OF BANDWIDTH OF AN EMBEDDED RESILIENT PACKET RING NETWORK

(75) Inventors: Yong Tang, Guangdong (CN); Xingyue Quan, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 800 days.

(21) Appl. No.: 11/224,631

(22) Filed: Sep. 12, 2005

(65) Prior Publication Data

US 2006/0062161 A1    Mar. 23, 2006

Related U.S. Application Data

(63) Continuation of application No. PCT/CN2004/000170, filed on Mar. 4, 2004.

(30) Foreign Application Priority Data

Mar. 11, 2003   (CN) ................................ 03 1 19558

(51) Int. Cl.
*H04L 12/28*    (2006.01)

(52) U.S. Cl. ........................ 370/258; 370/252; 370/465; 370/468; 370/907

(58) Field of Classification Search ........................ None
See application file for complete search history.

(56) References Cited

U.S. PATENT DOCUMENTS

| | | | |
|---|---|---|---|
| 6,011,804 A | 1/2000 | Bertin et al. | |
| 6,356,559 B1 | 3/2002 | Doucette et al. | |
| 6,985,488 B2 * | 1/2006 | Pan et al. | 370/395.3 |
| 7,020,158 B2 * | 3/2006 | Rouaud | 370/465 |

(Continued)

FOREIGN PATENT DOCUMENTS

GB    2 378 866    2/2003

OTHER PUBLICATIONS

Jones et al., "Proposed Text on Link Capacity Adjustment Scheme (LCAS) for SONET Virtually Concatenated SPEs to be Included in T1.105," *Contribution to TI Standards Project* (2000).

(Continued)

*Primary Examiner*—Michael J Moore, Jr.
(74) *Attorney, Agent, or Firm*—Marshall, Gerstein & Borun LLP

(57) ABSTRACT

Disclosed is a method for dynamically and losslessly adjusting bandwidth of an embedded Resilient Packet Ring (RPR) ring network, in which dynamic and lossless bandwidth adjustment for an RPR ring network embedded in a Synchronous Digital Hierarchy (SDH)/Synchronous Optical Network (SONET) can be realized through adding a Link Capacity Adjustment Scheme (LCAS) system in the SDH/SONET processing layer. When it is required to increase ring network bandwidth, the bandwidth of the link section between sites on the SDH/SONET processing layer is first increased. Then the LCAS system in the SDH/SONET processing layer is started, and the actual bandwidth of the link on the SDH/SONET processing layer is increased losslessly with the LCAS system. Finally the bandwidth of the ring network on the RPR processing layer is increased. When it is required to decrease ring network bandwidth, the bandwidth of the ring network on the RPR processing layer is first decreased. Then the LCAS system in the SDH/SONET processing layer is started, and the actual bandwidth of the link on the SDH/SONET processing layer is decreased losslessly with the LCAS system. Finally the bandwidth of the link section between sites on the SDH/SONET processing layer is decreased. With the disclosed method, dynamic and lossless bandwidth adjustment for an embedded RPR ring network in SDH/SONET can be realized.

8 Claims, 2 Drawing Sheets

U.S. PATENT DOCUMENTS

| | | | |
|---|---|---|---|
| 7,116,642 B2* | 10/2006 | Tofinetti et al. | 370/254 |
| 7,257,640 B1* | 8/2007 | Callocchia et al. | 709/233 |
| 2003/0137937 A1* | 7/2003 | Tsukishima et al. | 370/230 |
| 2004/0179518 A1* | 9/2004 | Bruckman et al. | 370/358 |

OTHER PUBLICATIONS

European Office Action for Application No. 04717013.9-1237, dated Apr. 16, 2007.

European Search Report for Application No. 04717013.9-2416, dated Oct. 5, 2006.

Shi et al., "Research on Bandwidth Management Mechanism of Resilient Packet Ring," IEEE 2002 International Conference on Communications, Circuits and Systems and West Sino Expositions, vol. 1, pp. 763-766 (2002).

* cited by examiner

METHOD FOR DYNAMIC LOSSLESS ADJUSTMENT OF BANDWIDTH OF AN EMBEDDED RESILIENT PACKET RING NETWORK

CROSS-REFERENCES TO RELATED APPLICATIONS

This is a continuation of International Application No. PCT/CN2004/000170 filed Mar. 4, 2004, which, in turn, claimed the benefit of Chinese Patent Application No. 03119558.X filed Mar. 11, 2003, the entire disclosures of which are hereby incorporated herein by reference.

BACKGROUND OF THE DISCLOSURE

1. Field of the Technology

The present disclosure relates to bandwidth adjusting technology for optical networks, especially to a method for dynamically and losslessly adjusting bandwidth of a Resilient Packet Ring (RPR) ring network, which is embedded in a synchronous digital network such as a Synchronous Digital Hierarchy (SDH)/Synchronous Optical Network (SONET).

2. Related Technology

An embedded RPR in an SDH/SONET can be used to improve the data transmission capability of an optical transmission device, and implement bandwidth space reuse, topology automatic detection, fairness algorithm etc. in the device.

An embedded RPR in the SDH/SONET is formed through adding an RPR processing layer above an SDH/SONET transmission layer. As shown in FIG. 1, an RPR ring network embedded in an SDH/SONET can be logically divided into an SDH processing layer 102 and an RPR processing layer 101, and the embedded RPR in the SDH/SONET comprises four sites 103.

Since the RPR is embedded in the SDH/SONET, it is necessary to allocate bandwidth for the RPR processing layer 101 above the SDH/SONET processing layer 102, for instance, the bandwidth of two virtual containers VC4 is allocated for the RPR processing layer 101 by the SDH/SONET processing layer 102 with a virtual cascade technique. When it is required to increase or decrease the bandwidth of an optical transmission device for some reason, operation of the optical transmission device should be paused and restarted after bandwidth allocation has been changed, because a dynamic and lossless bandwidth-adjusting technique is not supported in the entire ring network. However, by doing this, service data transmission in the optical transmission device will certainly be interrupted, making the SDH/SONET processing layer 102 and the RPR processing layer 101 incapable of working normally.

In addition, for an RPR ring network with bandwidth equaling to N virtual containers, when a certain virtual container on a certain link section of the RPR ring network encounters a malfunction, other undamaged virtual containers in the same link section or even in the entire ring network will be out of use since the bandwidth must remain consistent in the ring network. In this way, protection switching will be implemented in the entire RPR ring network, halving the bandwidth and greatly decreasing the utilization ratio.

SUMMARY OF THE DISCLOSURE

In accordance with one aspect of the disclosure, a method is provided for adjusting bandwidth of an embedded RPR ring network dynamically and losslessly, so as to realize dynamic and lossless bandwidth adjustment for an embedded RPR ring network in an SDH/SONET.

In one aspect, disclosed is a method for adjusting bandwidth of an embedded RPR ring network dynamically and losslessly, applicable for an embedded RPR ring network in an SDH/SONET having an SDH/SONET processing layer and an RPR processing layer. In this method, a Link Capacity Adjustment Scheme (LCAS) system is added in the SDH/SONET processing layer. The method includes the following steps:

A1. allocating a demanded bandwidth as bandwidth of a link between sites to be increased in a ring network on the SDH/SONET processing layer;

B1. starting the LCAS system in the SDH/SONET processing layer, and losslessly increasing the actual bandwidth of the link, in which bandwidth is required to be increased, of the ring network on the SDH/SONET processing layer to the demanded bandwidth; and C1. configuring the demanded bandwidth as bandwidth of the ring network on the RPR processing layer.

In one embodiment, step A1 includes the step of allocating the demanded bandwidth as bandwidth of links between all sites in the ring network on the SDH/SONET processing layer.

In some cases, step B1 includes the steps of starting the LCAS system in the SDH/SONET processing layer, and losslessly increasing the actual bandwidth of the links of the entire ring network on the SDH/SONET processing layer to the demanded bandwidth.

In some embodiments, step C1 is implemented through adjusting bandwidth allocation parameters of the ring network on the RPR processing layer.

In step B1, the LCAS system in the SDH/SONET processing layer is started in a manual manner or an automatic manner.

In another aspect, a method is disclosed for adjusting bandwidth of an embedded RPR ring network dynamically and losslessly, applicable for an embedded RPR ring network in an SDH/SONET having an SDH/SONET processing layer and an RPR processing layer. In this method, a LCAS system is added in the SDH/SONET processing layer. The method includes the following steps of:

A2. allocating a demanded bandwidth as bandwidth of a ring network on the RPR processing layer;

B2. starting the LCAS system in the SDH/SONET processing layer, and losslessly decreasing the actual bandwidth of the link, in which bandwidth is required to be decreased, of the ring network on the SDH/SONET processing layer to the demanded bandwidth; and C2. configuring a demanded bandwidth as bandwidth of a link between sites to be decreased in the ring network on the SDH/SONET processing layer.

In one embodiment, step B2 includes the steps of starting the LCAS system in the SDH/SONET processing layer, and losslessly decreasing the actual bandwidth of the links of the entire ring network on the SDH/SONET processing layer to the demanded bandwidth.

In some cases, step C2 includes the step of configuring the demanded bandwidth as bandwidth of links between all sites in the ring network on the SDH/SONET processing layer.

In some embodiments, step A2 is implemented through adjusting bandwidth allocation parameters of the ring network on the RPR processing layer.

After step C2, the method further includes, in some cases, the step of removing redundant virtual containers in links between sites of the ring network on the SDH/SONET processing layer.

In step B2, the LCAS system in the SDH/SONET processing layer is started in a manual manner or an automatic manner.

By adding a LCAS system in the SDH processing layer of the RPR ring network in a SDH/SONET, network bandwidth characteristics can be changed losslessly via a link capacity adjustment technique, thereby implementing dynamic and lossless bandwidth adjustment for the entire ring network or a certain ring network section of the embedded RPR in the SDH/SONET. In this way, when bandwidth of a certain link section of the entire ring network is changed due to malfunction or malfunction restoration, bandwidth of other links with no malfunction can be changed via the link capacity adjustment technique, so as to keep bandwidth consistent for the entire ring network at all times, making the entire ring network still work normally without requiring protection switching and avoiding resource waste.

DETAILED DESCRIPTION OF PREFERRED EMBODIMENTS

Now, the disclosed method will be described in detail hereinafter with reference to the accompanying drawings.

Generally speaking, a Link Capacity Adjustment Scheme (LCAS) is combined with a virtual cascade technique. More specifically, a LCAS system is added in the SDH/SONET processing layer, with which dynamic and lossless bandwidth adjustment can be realized for the entire embedded RPR ring network in the SDH/SONET. Meanwhile, when a certain virtual container VCx in a certain section of the embedded RPR ring network in the SDH/SONET encounters a malfunction, or when it is required to increase or decrease bandwidth of a certain section of the embedded RPR ring network in the SDH/SONET, the entire embedded RPR ring network in the SDH/SONET can keep working normally without the need for protection switching, thus avoiding resource waste.

In conventional technology, RPR data frames are encapsulated into the payload of N virtual containers by the SDH/SONET processing layer via a virtual cascade technique. The virtual cascade technique can be used to realize continuous bandwidth allocation for the entire ring network, namely it is capable of supporting bandwidth allocation for the entire ring network. On the other hand, the disclosed LCAS technique can increase or decrease the number of virtual containers dynamically and losslessly, thus increasing or decreasing the total network mapping capacity, with which lossless data transmission can be realized during the process of adjusting the network capacity. Meanwhile, when a certain virtual container in the network is detected as invalid through the LCAS technique, the LCAS technique can automatically reduce network capacity and remove the invalid virtual container; when it is detected through the LCAS technique that the invalid virtual container has been restored, the restored virtual container can be reloaded, and the current network capacity will be automatically restored to that before this virtual container was invalid. Therefore, by performing LCAS protocol processing on the basis of the virtual cascade technique, the present invention can combine the bandwidth allocation and the bandwidth adjustment for an embedded RPR ring network in the SDH/SONET, thus achieving dynamic and lossless adjustment of bandwidth of a ring network.

Figure 1:
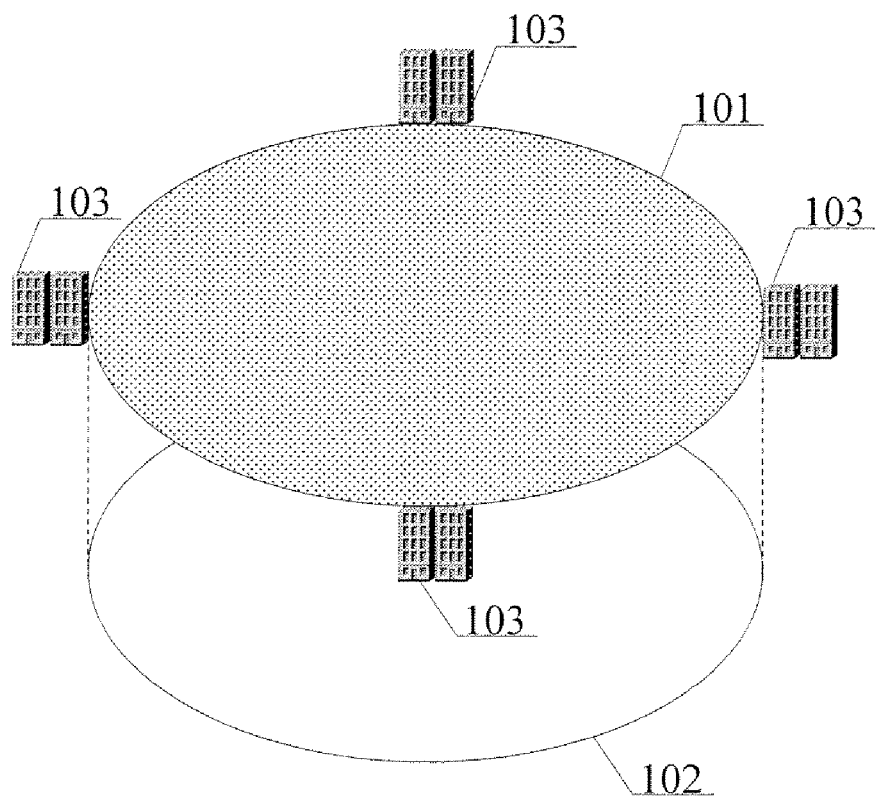
FIG. 1 is a schematic diagram illustrating a logical structure of an embedded RPR ring network in an SDH/SONET according to the prior art.
Figure 1:
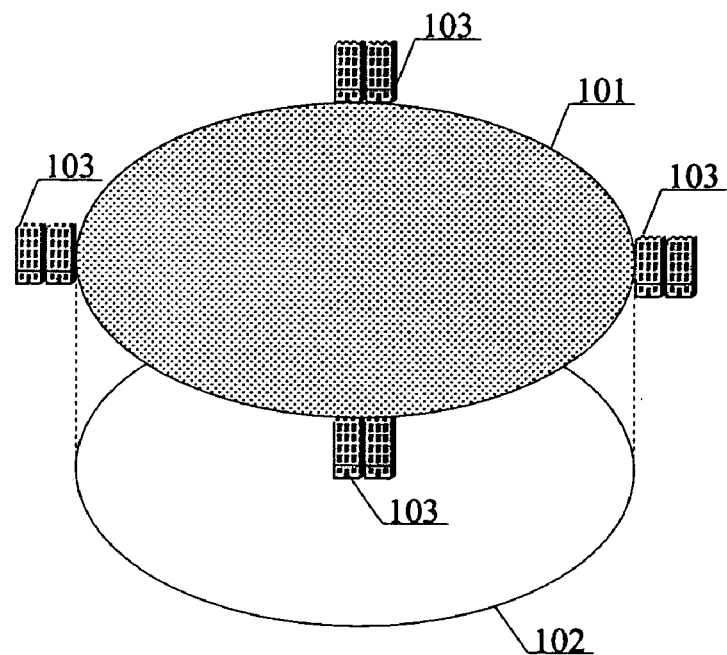
Figure 2:
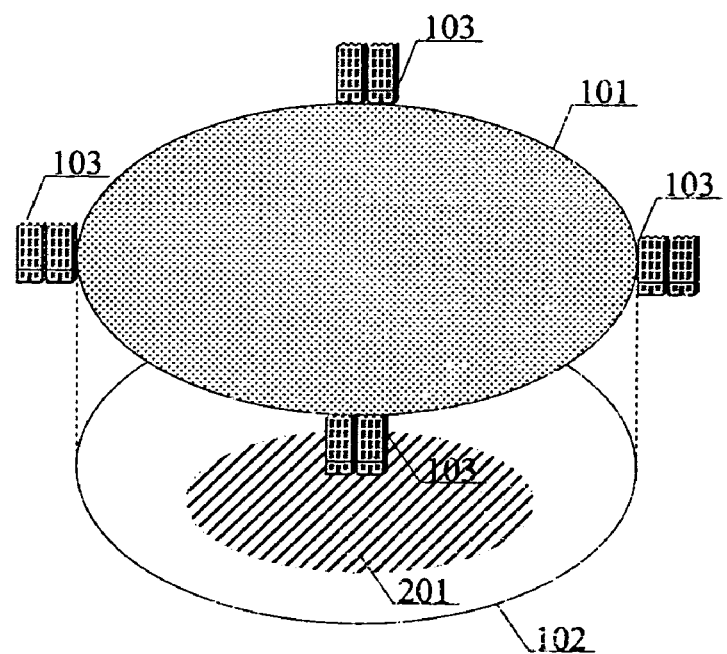
FIG. 2 is a schematic diagram illustrating a logical structure of an embedded RPR ring network in an SDH/SONET according to one embodiment.

FIG. 2 is a schematic diagram illustrating the logical structure of an embedded RPR ring network in an SDH/SONET according to one embodiment. As shown in FIG. 2, LCAS system 201 is added in SDH/SONET processing layer 102 of an embedded RPR ring network in the SDH/SONET.

With coordinated operation of the SDH/SONET processing layer 102, the RPR processing layer 101 and LCAS system 201 of the embedded RPR ring network in the SDH/SONET, dynamic and lossless adjustment of bandwidth of the embedded RPR ring network in the SDH/SONET is implemented; meanwhile, it is still guaranteed that the embedded RPR ring network in the SDH/SONET works normally when bandwidth of a certain link section in the embedded RPR ring network in the SDH/SONET is increased or decreased, which will be described in detail hereinafter.

When it is needed to increase bandwidth of the entire embedded RPR ring network in the SDH/SONET, for instance, when it is required to increase the bandwidth of an embedded RPR ring network in the SDH/SONET from three virtual containers VC3/STS-1 to four virtual containers VC3/STS-1 due to network capacity expansion, the specific steps for dynamically and losslessly adjusting the bandwidth of the RPR ring network in the SDH/SONET are described below.

First, the bandwidth between each site of the ring network on the SDH/SONET processing layer 102 is increased, that is, the bandwidth between each site is adjusted from three virtual containers VC3/STS-1 to four virtual containers VC3/STS-1 by means of either manual operation or automatic allocation. Then, the LCAS system 201 in the SDH/SONET processing layer 102 is started, and the bandwidth of the entire ring network on the SDH/SONET processing layer 102 is increased losslessly from three virtual containers VC3/STS-1 to four virtual containers VC3/STS-1. Finally, bandwidth allocation parameters of the ring network on the RPR processing layer 101 are adjusted, and the bandwidth of the entire ring network on the RPR processing layer 101 is increased losslessly from three virtual containers VC3/STS-1 to four virtual containers VC3/STS-1, thereby completing a lossless bandwidth increment of the entire embedded RPR ring network in the SDH/SONET.

Similarly, when it is needed to decrease bandwidth of the entire embedded RPR ring network in the SDH/SONET, for instance, when it is required to decrease the bandwidth of an embedded RPR ring network in the SDH/SONET from three virtual containers VC3/STS-1 to two virtual containers VC3/STS-1 due to a requirement of a client, the specific steps for dynamically and losslessly adjusting bandwidth of the RPR ring network in the SDH/SONET are described below.

First, bandwidth allocation parameters of the ring network on the RPR processing layer 101 are adjusted, and the bandwidth of the entire ring network on the RPR processing layer 101 is decreased losslessly from three virtual containers VC3/STS-1 to two virtual containers VC3/STS-1. Then, the LCAS system 201 in the SDH/SONET processing layer 102 is started, and the bandwidth of the entire ring network on the SDH/SONET processing layer 102 is decreased losslessly from three virtual containers VC3/STS-1 to two virtual containers VC3/STS-1. Finally, the bandwidth between each site of the ring network on the SDH/SONET processing layer 102 is decreased, that is, the bandwidth between each site is adjusted from three virtual containers VC3/STS-1 to two virtual containers VC3/STS-1, and one redundant virtual container VC3/STS-1 between each site is removed. The adjustment can be carried out by means of either manual operation or automatic allocation. In this way, a lossless bandwidth decrement of the entire embedded RPR ring network in the SDH/SONET is completed.

In addition, when bandwidth of a certain section of the embedded RPR ring network in the SDH/SONET is increased or decreased, that is, when bandwidth between sites is increased or decreased, normal operation of the embedded RPR ring network in the SDH/SONET can be guaranteed with the disclosed method without requiring protection switching.

Taking the situation that a certain section of link encounters a malfunction as an example and assuming that the bandwidth of the current entire embedded RPR ring network in the SDH/SONET is four virtual containers VC3/STS-1, when a virtual container VC3/STS-1 between two certain sites encounters a malfunction, bandwidth of other links having no malfunction can be decreased by operation of the LCAS system 201 so as to guarantee bandwidth consistency of the entire ring network. Specifically, first, bandwidth allocation parameters of the ring network on the RPR processing layer 101 are adjusted, and the bandwidth of the entire ring network on the RPR processing layer 101 is decreased losslessly from four virtual containers VC3/STS-1 to three virtual containers VC3/STS-1. Then, the LCAS system in the SDH/SONET processing layer 102 is started, and the bandwidth of the entire ring network on the SDH/SONET processing layer 102 is decreased losslessly from four virtual containers VC3/STS-1 to three virtual containers VC3/STS-1. Finally, the bandwidth between each site of the ring network on the SDH/SONET processing layer 102 is decreased, that is, the bandwidth between each site is decreased from four virtual containers VC3/STS-1 to three virtual containers VC3/STS-1, thus completing a bandwidth consistency adjustment for the entire embedded RPR ring network in the SDH/SONET without requiring protection switching.

When the virtual container VC3/STS-1 with a malfunction between two sites is restored to normal, bandwidth of other links with no malfunction should be increased still by operation of the LCAS system 201 so as to guarantee bandwidth consistency of the entire ring network. Specifically speaking, first, the bandwidth between each site of the ring network on the SDH/SONET processing layer 102 is increased, that is, the bandwidth between each site is increased from three virtual containers VC3/STS-1 to four virtual containers VC3/STS-1. Then, the LCAS system 201 in the SDH/SONET processing layer 102 is started, and the bandwidth of the entire ring network on the SDH/SONET processing layer 102 is increased losslessly from three virtual containers VC3/STS-1 to four virtual containers VC3/STS-1. Finally, bandwidth allocation parameters of the ring network on the RPR processing layer 101 are adjusted, and the bandwidth of the entire ring network on the RPR processing layer 101 is increased losslessly from three virtual containers VC3/STS-1 to four virtual containers VC3/STS-1, thereby completing a bandwidth consistency adjustment for the entire embedded RPR ring network in the SDH/SONET.

In implementing the course of the above scheme, the LCAS system 201 in the SDH/SONET processing layer 102 can be started either manually or automatically, i.e., the LCAS system 201 can be started by inputting configuration commands in real time, or by predefining the conditions for starting the LCAS system 201. With the latter option, the LCAS system 201 will be started automatically when the conditions are satisfied.

In summary, the above description sets forth preferred embodiments of the present invention, and is not to be construed as confining the protective scope of the following claims.

The invention claimed is:

1. A method for adjusting bandwidth of an embedded Resilient Packet Ring (RPR) ring network dynamically and losslessly, the embedded RPR ring network being in a Synchronous Digital Hierarchy/Synchronous Optical Network (SDH/SONET) comprising an SDH/SONET processing layer and an RPR processing layer, the method comprising:
   (A1) allocating, by a network manager, a demanded bandwidth as bandwidth of a link between sites to be increased in the RPR ring network on the SDH/SONET processing layer;
   (B1) starting, by any of the sites of the embedded RPR ring network and in an automatic manner, a Link Capacity Adjustment Scheme (LCAS) system in the SDH/SONET processing layer after the demanded bandwidth is allocated to the SDH/SONET processing layer, and losslessly increasing, by the LCAS, an actual bandwidth of the link, in which the actual bandwidth is required to be increased to the demanded bandwidth; and
   (C1) after the LCAS system increases the actual bandwidth of the link of the ring network on the SDH/SONET processing layer to the demanded bandwidth, the network manager configuring the demanded bandwidth as bandwidth of the RPR ring network on the RPR processing layer.

2. The method according to claim 1, wherein
   A1 comprises allocating, by the network manager, the demanded bandwidth as bandwidth of links between all sites in the RPR ring network on the SDH/SONET processing layer; and
   B1 comprises starting, by any of the sites of the embedded RPR ring network in an automatic manner, the LCAS system in the SDH/SONET processing layer after the demanded bandwidth is allocated to the SDH/SONET processing layer, and losslessly increasing, by the LCAS system, the actual bandwidth of the links between all sites in the RPR ring network on the SDH/SONET processing layer to the demanded bandwidth.

3. The method according to claim 2, wherein C1 is implemented by the network manager through adjusting bandwidth allocation parameters of the RPR ring network on the RPR processing layer.

4. A method for adjusting bandwidth of an embedded Resilient Packet Ring (RPR) ring network dynamically and losslessly, the embedded RPR ring network being in a Synchronous Digital Hierarchy/Synchronous Optional Network (SDH/SONET) comprising an SDH/SONET processing layer and an RPR processing layer, the method comprising:
   (A2) allocating, by a network manager, a demanded bandwidth as bandwidth of the RPR ring network on the RPR processing layer;
   (B2) starting, by any of sites of the embedded RPR ring network and in an automatic manner, a Link Capacity Adjustment Scheme (LCAS) system in the SDH/SONET processing layer after the demanded bandwidth is allocated to the RPR processing layer, and losslessly decreasing, by the LCAS system, an actual bandwidth of a link of the RPR ring network on the SDH/SONET processing layer, in which the actual bandwidth is required to be decreased to the demanded bandwidth; and
   (C2) after the LCAS system decreases the actual bandwidth of the link of the ring network on the SDH/SO- NET processing layer to the demanded bandwidth, the network manager configuring the demanded bandwidth as bandwidth of the link between the sites to be decreased in the ring network on the SDH/SONET processing layer.

5. The method according to claim 4, wherein B2 comprises starting, by any of the sites of the embedded RPR ring network in an automatic manner, the LCAS system in the SDH/SONET processing layer after the demanded bandwidth is allocated to the RPR processing layer, and losslessly decreasing, by the LCAS system, the actual bandwidth of links between all sites in the RPR ring network on the SDH/SONET processing layer to the demanded bandwidth; and C2 comprises configuring, by the network manager, the demanded bandwidth as bandwidth of the links between all sites in the RPR ring network on the SDH/SONET processing layer.

6. The method according to claim 5, wherein A2 is implemented by the network manager through adjusting bandwidth allocation parameters of the RPR ring network on the RPR processing layer.

7. The method according to claim 5, after C2, further comprising removing redundant virtual containers in links between sites of the RPR ring network on the SDH/SONET processing layer by the LCAS system.

8. An apparatus for adjusting bandwidth of an embedded Resilient Packet (RPR) ring network dynamically and losslessly, the embedded RPR ring network being in a Synchronous Digital Hierarchy/Synchronous Optical Network (SDH/SONET) comprising an SDH/SONET processing layer and an RPR processing layer, the apparatus comprising:

sites of the embedded RPR ring network and a Link Capacity Adjustment Scheme (LCAS) system in the SDH/SONET processing layer;

where any of the sites of the embedded RPR ring network is configured to start the LCAS system in the SDH/SONET processing layer in an automatic manner after detecting that demanded bandwidth is allocated to the RPR processing layer by a network manager;

where the LCAS system is configured to losslessly decrease actual bandwidth of a link, in which bandwidth is required to be decreased, of the ring network on the SDH/SONET processing layer to the demanded bandwidth; and wherein after the LCAS system decreases the actual bandwidth of the link of the ring network on the SDH/SONET processing layer to the demanded bandwidth, the demanded bandwidth is configured by the network manager as bandwidth of the link between the sites to be decreased in the ring network on the SDH/SONET processing layer.

* * * * *